United States Patent
Mizutani (10) Patent No.: US 7,585,591 B2
(45) Date of Patent: Sep. 8, 2009

(54) BATTERY INCLUDING ROLLED ELECTRODES AND STRAIGHT LEAD TERMINALS

(75) Inventor: Toru Mizutani, Fukushima (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 11/052,034

(22) Filed: Feb. 8, 2005

(65) Prior Publication Data
US 2005/0175892 A1      Aug. 11, 2005

(30) Foreign Application Priority Data
Feb. 9, 2004    (JP)    .............. 2004-031891

(51) Int. Cl.
*H01M 4/00* (2006.01)
*H01M 4/02* (2006.01)
(52) U.S. Cl. .......... 429/211; 429/94; 429/209
(58) Field of Classification Search .......... 429/94, 429/300, 185
See application file for complete search history.

(56) References Cited

U.S. PATENT DOCUMENTS 5,552,239 A    9/1996   Gozdz et al.
6,387,562 B1*  5/2002   Akahira ................ 429/94
6,451,472 B1*  9/2002   Chang et al. .......... 429/94
2002/0102464 A1*  8/2002   Yoshida et al. ....... 429/300
2003/0167627 A1    9/2003   Fujino et al.
2003/0180609 A1*  9/2003   Yamashita et al. .... 429/185

FOREIGN PATENT DOCUMENTS

EP    1 049 180 A1    11/2000
JP    2004-22363      1/2004

OTHER PUBLICATIONS

Patent Abstracts of Japan, JP 09-199099, Jul. 31, 1997.

* cited by examiner

*Primary Examiner*—Dah-Wei D. Yuan
*Assistant Examiner*—Zachary Best
(74) *Attorney, Agent, or Firm*—Oblon, Spivak, McClelland, Maier & Neustadt, P.C.

(57) ABSTRACT

A battery includes a unit cell including spirally rolled electrodes, a jacket having a recessed section, a cathode lead terminal, and an anode lead terminal. The unit cell is placed in the recessed section, the recessed section is covered with a portion of the jacket, and the cathode and anode lead terminals are each connected to corresponding outer ends of the rolled electrodes, are placed on the side of the rolled electrodes that is exposed from an opening of the recessed section, and extend straight out of the jacket.

9 Claims, 8 Drawing Sheets

BATTERY INCLUDING ROLLED ELECTRODES AND STRAIGHT LEAD TERMINALS

BACKGROUND OF THE INVENTION

1. Field of the Invention

The present invention relates to batteries including rolled electrodes and particularly relates to a battery, such as a lithium ion polymer secondary battery, including rolled electrodes. The rolled electrode-including battery has a structure in which electrolyte layers, a cathode, and an anode are layered or rolled.

2. Description of the Related Art

In recent years, mobile electronic devices such as notebook personal computers, mobile phones, and personal digital assistants (PDAs) have been widely used. Therefore, lithium ion batteries are widely used as power supplies for such devices because the batteries have high voltage and energy density and is light in weight.

Since batteries containing electrolyte solutions have a problem in that the solutions leak out the batteries, a lithium ion polymer secondary battery including the following component has been commercialized: a solid electrolyte or a gel polymer membrane impregnated with a nonaqueous electrolyte solution.

The lithium ion polymer secondary battery has a cell structure in which a unit cell including a cathode, an anode, and a polymer electrolyte is covered with a jacket such as an aluminum laminate, the cathode and the anode each being connected to corresponding leads. The unit cell and a wiring board having a circuit section mounted thereon are housed in a plastic molded case consisting of an upper part and a lower part.

In order to reduce the internal resistance, the lithium ion polymer secondary battery must have a large reaction area. Therefore, the lithium ion polymer secondary battery is prepared by spirally rolling a plurality of electrodes depending on the thickness of the battery, whereby the battery is allowed to have an increased reaction area. A battery including a plurality of electrodes spirally rolled is herein referred to as a rolled electrode-including battery.

Figure 4:
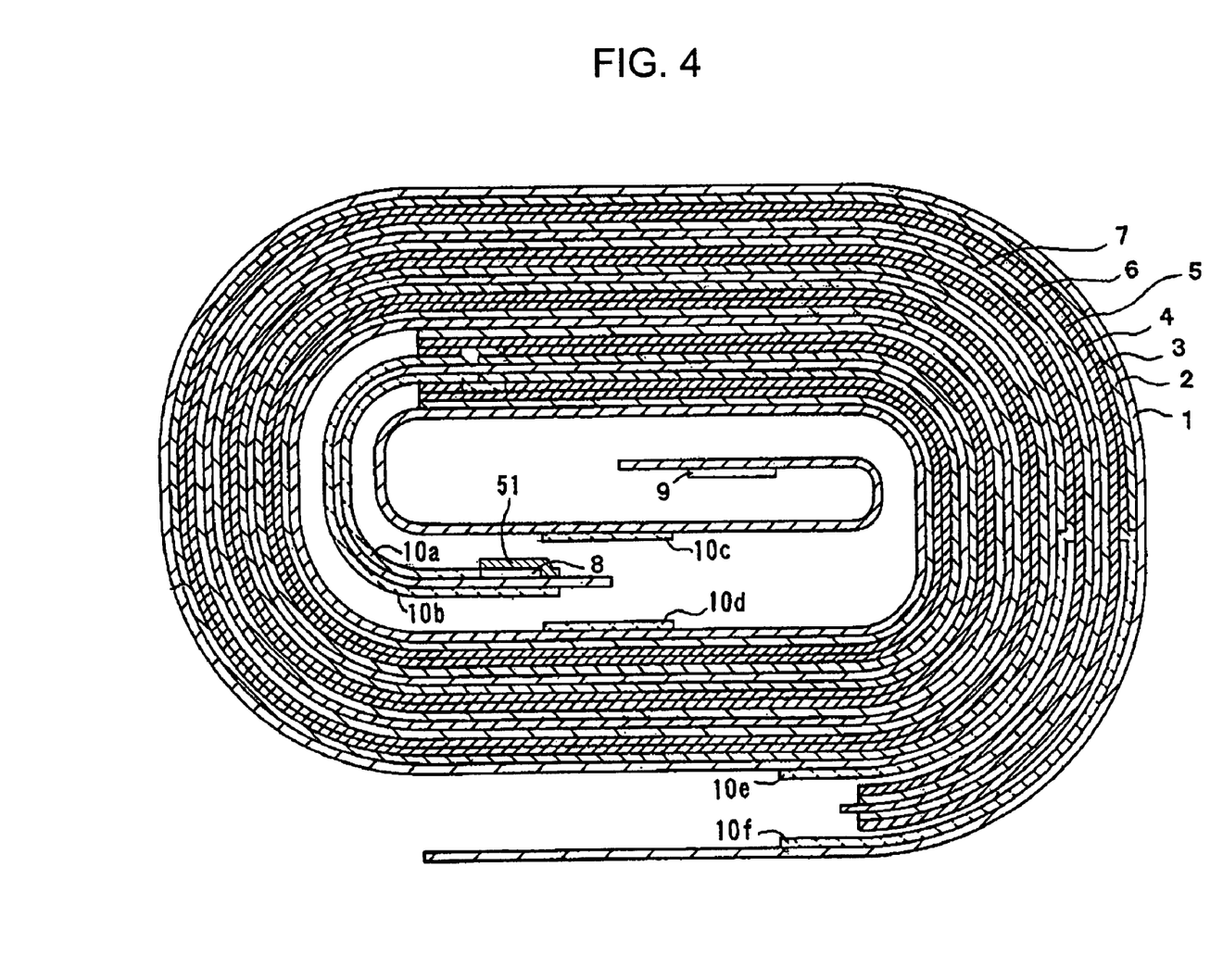
FIG. 4 is a schematic view showing a configuration of a known lithium ion polymer secondary battery to which the present invention is applicable.

FIG. 4 is an illustration showing a lithium ion polymer secondary battery which is an example of a known rolled electrode-including battery and to which the present invention is applicable. The lithium ion polymer secondary battery includes a cathode, an anode, and an electrolyte section placed therebetween, these components being rolled to form a layered structure. The cathode includes a cathode current collector 1 and a cathode active material layer 2 attached thereto. The anode includes an anode current collector 7 and an anode mix layer 6 attached thereto.

The electrolyte section includes a cathode electrolyte layer 3 and an anode electrolyte layer 5 that are separated from each other by a separator 4. The battery further includes a cathode lead terminal 8, an anode lead terminal 9, and covers (protective tapes) 10a, 10b, 10c, 10d, 10e, 10f, and 10g and those components form a principal internal structure of the battery.

Figure 5:
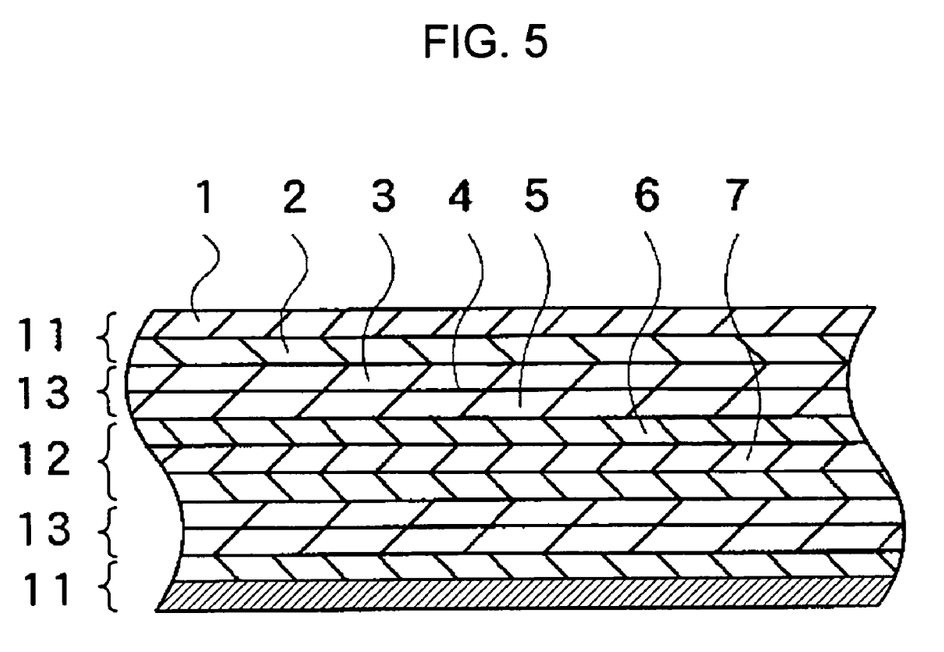
FIG. 5 is an enlarged view showing a layered portion of the lithium ion polymer secondary battery shown in FIG. 4.

FIG. 5 is an enlarged view showing a layered portion of the lithium ion polymer secondary battery shown in FIG. 4. Reference numeral 11 represents the cathode, reference numeral 12 represents the anode, and reference numeral 13 represents the electrolyte section. The cathode current collector 1 includes a metal strip containing aluminum (Al) or the like. The cathode active material layer 2 includes a film containing an active material such as lithium (Li), cobalt (Co), manganese (Mg), nickel (Ni), cadmium (Cd), or graphite and a binder for bonding the cathode active material layer 2 to the cathode current collector 1.

The anode current collector 7 includes a metal strip containing copper (Cu). The anode mix layer 6 includes a film containing an active material such as a carbonaceous material or the like and a binder for bonding the anode mix layer 6 to the anode current collector 7.

The cathode electrolyte layer 3 and anode electrolyte layer 5 included in the electrolyte section 13 contain a gel polymer having good electrochemical properties. The gel polymer is bendable and flexible and contains an electrolyte prevented from leaking out. In order to satisfy such requirements, the electrolyte is preferably distributed in the gel polymer uniformly.

The separator 4 contains a material which can securely separate the cathode electrolyte layer 3 from the anode electrolyte layer 5 and which allows ions to substantially freely migrate between the cathode 11 and the anode 12. Examples of such a material include microporous polypropylene.

The covers 10a, 10b, 10c, 10d, 10e, 10f, and 10g are used to prevent the cathode 11 and the anode 12 from making contact with each other due to deterioration with age or the pressure applied to the battery from outside.

Japanese Unexamined Patent Application Publication No. 2001-266946 discloses a lithium ion battery including a cathode, an anode, an electrolyte layer, and an insulating cover. At least one end of one of the cathode and the anode is exposed from the electrolyte layer and the other one faces the exposed end and is covered with the insulating cover.

Figure 6:
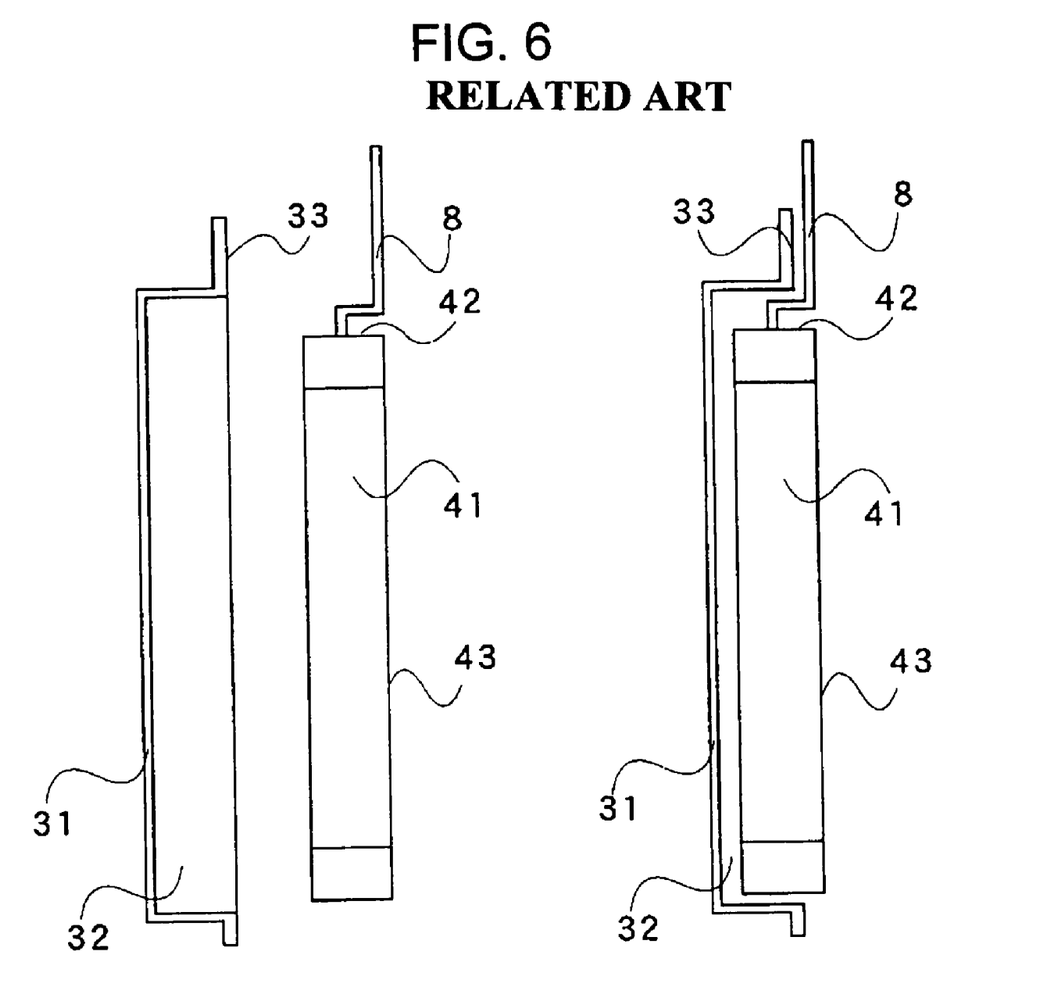
FIG. 6 is a schematic view showing a jacket for covering a unit cell having a conventional configuration.

With reference to FIG. 6, a cathode lead electrode and anode lead electrode are connected to a plurality of electrodes spirally rolled and a unit cell 41 with a flat shape is covered with a jacket 31 laminated with aluminum. The jacket 31 has a recessed section 32 formed by a punching process and a terrace section 33. The jacket 31 further has an untreated folding section, not shown, for covering the recessed section 32. The unit cell 41 is placed in the recessed section 32, which is covered with the folding section, of which end portions are fixed to the terrace section 33 by thermal fusion.

In the known battery, a cathode lead terminal 8 is fixed to a leading portion of a rolled cathode current collector 1, the leading portion being not covered with a cathode active material layer 2, and an anode lead terminal 9 is fixed to a leading portion of an rolled anode current collector 7, the leading portion being not covered with an anode active material layer 3. Alternatively, the anode lead terminal 9 is fixed to a tail portion of the anode current collector 7 in some cases, the tail portion being not covered with the anode active material layer 3. In both cases, the cathode lead terminal 8 extends outward from the center of the coil of the rolled electrodes.

Figure 7:
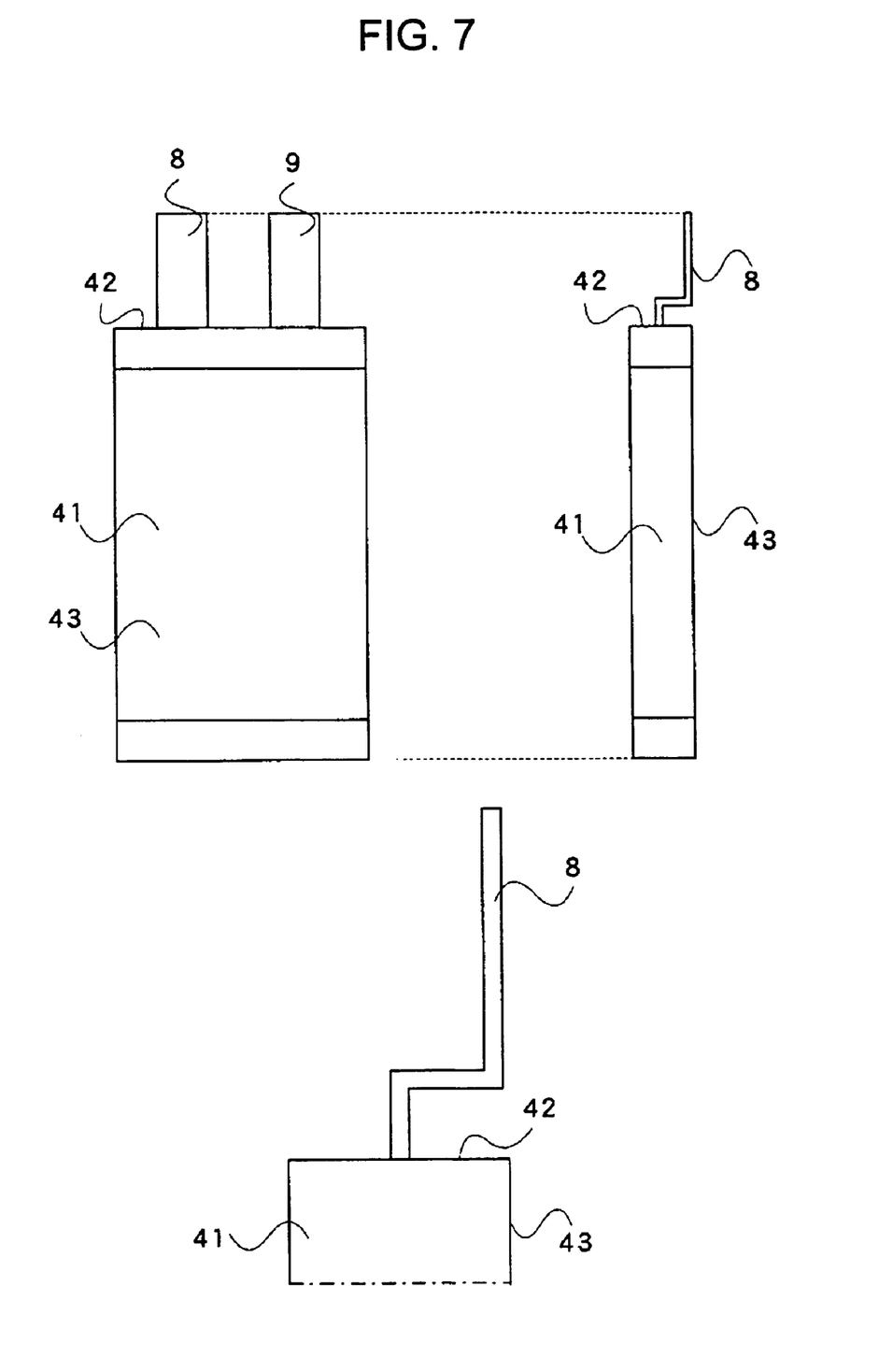
FIG. 7 is a schematic view showing a known unit cell having portions from which lead electrodes extend.

The recessed section 32 of the jacket 31 in which the unit cell 41 is placed is hermetically sealed. Therefore, in order to allow the cathode and anode lead terminals 8 and 9 to extend out of the recessed section 32, the cathode and anode lead terminals 8 and 9 must be bent into an L shape at their portions near a side face 42 of the unit cell 41 as shown in FIGS. 6 and 7, the side face 42 having portions from which the cathode and anode lead terminals 8 and 9 extend. Reference numeral 43 represents an outward face of the unit cell 41 placed in the recessed section 32, the outward face facing the opening of the recessed section 32.

A lead terminal, for example, the cathode lead terminal 8, bent as described above is pressed against the rolled electrodes when the unit cell 41 placed in the recessed section 32. Therefore, the cathode lead terminal 8 makes contact with the rolled electrodes and this creates a short circuit between the cathode lead terminal 8 and the rolled electrodes in some cases.

Figure 8A:
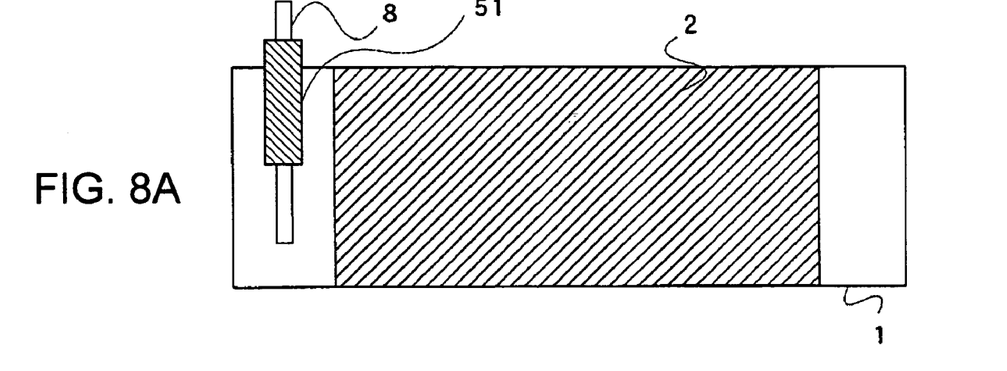
FIGS. 8A, 8B and 8C, is a schematic view showing a known unit cell having portions from which lead electrodes extend.
Figure 8B:
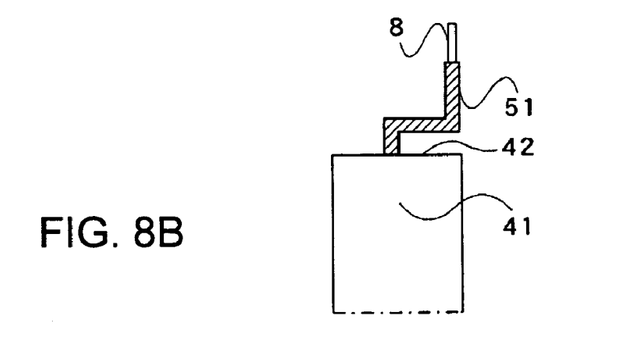
Figure 8C:
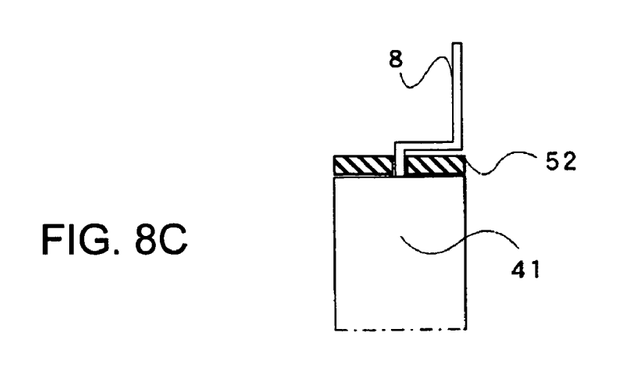

In order to prevent a short circuit from occurring therebetween, a protective tape 51 acting as an insulator is wound around the cathode lead terminal 8 fixed to the leading portion of the rolled cathode current collector 1 as shown in FIGS. 8A and 8B in such a manner that portions of the protective tape 51 overlap one another (see FIG. 4). Alternatively, an insulating sheet 52 is placed over the side face 42 as shown in FIG. 8C.

In the known battery having the above configuration, the cathode lead terminal 8 must be bent into an L shape and portions of the protective tape 51 overlap one another. This causes an increase in the thickness of the unit cell 41. Therefore, there is a problem in that the battery has a small capacity because the number of windings of the rolled electrodes must be reduced when the battery has a limited thickness. Furthermore, when the insulating sheet 52 is used, a space occupied by the insulating sheet 52 is necessary in addition to a space occupied by the cathode lead terminal 8 bent into an L shape. Therefore, there is a problem in that the battery has a small capacity because the width of the rolled electrodes must be reduced when the battery has a limited length or width.

SUMMARY OF THE INVENTION

Accordingly, it is an object of the present invention to provide a battery including rolled electrodes. The capacity of the battery is prevented from being reduced due to a protective tape or an insulating sheet for preventing a lead electrode from being bent into an L shape or preventing a short circuit from occurring between the lead electrode and the rolled electrodes.

In order to solve the above problems, the present invention provides a battery including a unit cell including spirally rolled electrodes, a jacket having a recessed section, a cathode lead terminal, and an anode lead terminal. The unit cell is placed in the recessed section. The recessed section is covered with a portion of the jacket. The cathode and anode lead terminals are each connected to corresponding outer ends of the rolled electrodes, are placed on the side of the rolled electrodes that are exposed from an opening of the recessed section, and extend straight out of the jacket.

In the present invention, although the unit cell is placed in the recessed section of the jacket, the lead terminals are not bent but extend straight out of the jacket. Therefore, insulating tapes for preventing a short circuit from occurring between the lead terminals and the rolled electrodes need not be wound around the lead terminals or an insulating strip for preventing such a short circuit need not be placed on a side of the unit cell. Thus, the battery of the present invention has high capacity.

BRIEF DESCRIPTION OF THE DRAWINGS

FIG. 8, including

DESCRIPTION OF THE PREFERRED EMBODIMENT

A battery including rolled electrodes according to an embodiment of the present invention will now be described with reference to the accompanying drawings. The term "battery including rolled electrodes" or "rolled electrode-including battery" herein means a battery including a cathode, an anode, and an electrolyte section for separating the cathode from the anode, those components being rolled. The rolled electrode-including battery is described below using a lithium ion polymer secondary battery as an example.

Figure 1:
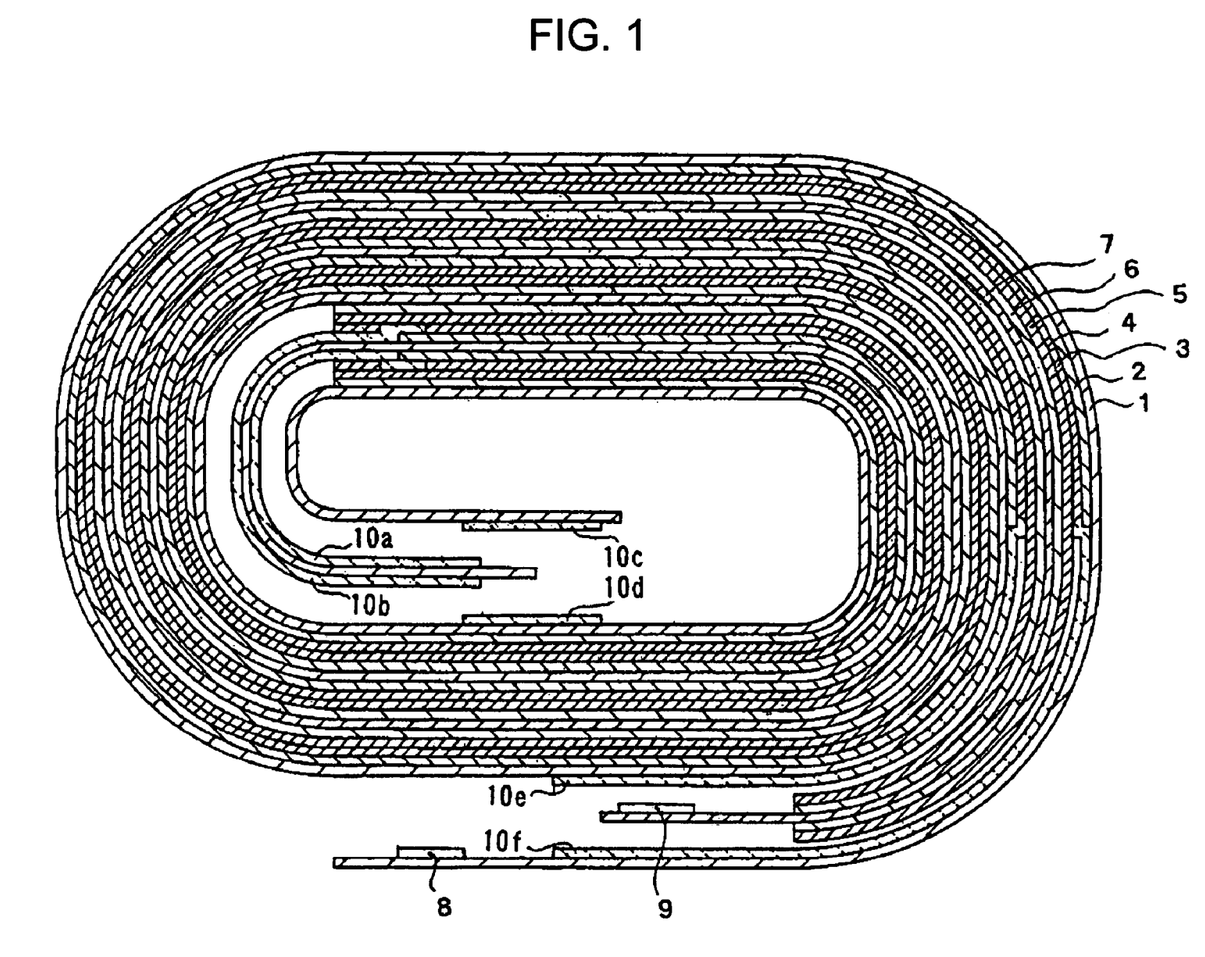
FIG. 1 is a schematic view showing a configuration of a lithium ion polymer secondary battery according to an embodiment of the present invention.

FIG. 1 is an illustration showing an example of a lithium ion polymer secondary battery including rolled electrodes. In particular, the lithium ion polymer secondary battery includes a cathode, an anode, and an electrolyte section for separating the cathode from the anode, those components being spirally rolled.

The cathode includes a cathode current collector 1 and a cathode active material layer 2 attached thereto. The cathode active material layer 2 contains one or more cathode active materials such as a cathode material for storing and releasing lithium ions and may further contain a conductive material such as a carbonaceous material or the like and a binder such as polyvinylidene fluoride according to needs. Preferable examples of the cathode material include lithium metal oxide represented by the formula $Li_xMIO_2$. This is because the lithium metal oxide can create high voltage and provide high energy density. In the formula $Li_xMIO_2$, MI represents one or more transition metals and is preferably at least one of cobalt (Co) and nickel (Ni) and x varies depending on the charge status of the battery and satisfies the formula $0.05 \leq x \leq 1.10$. Examples of the lithium metal oxide include $LiCoO_2$ and $LiNiO_2$ in particular.

The cathode active material layer 2 can be prepared by, for example, the procedure below. One half mole of lithium carbonate ($Li_2CO_3$) and one mole of cobalt carbonate ($CoCO_3$) are mixed. The mixture is fired at 900° C. for five hours in air, whereby lithium cobalt oxide ($LiCoO_2$) used as a cathode active material is obtained. Subsequently, 91 parts by mass of the lithium cobalt oxide, six parts by mass of graphite used as a conductive material, and three parts by mass of polyvinylidene fluoride acting as a binder are mixed, whereby a cathode mix is prepared. The cathode mix is dispersed in N-methyl-2-pyrrolidone acting as a solvent, whereby cathode mix slurry is prepared. The cathode mix slurry is applied onto the cathode current collector 1 including an aluminum sheet, dried, and then press-molded, whereby the cathode active material layer 2 is formed.

The anode includes an anode current collector 7 and an anode mix layer 6 attached thereto. The anode mix layer 6 contains one or more anode active materials such as a carbonaceous material and may further contain a binder such as polyvinylidene fluoride according to needs. The carbonaceous material is preferable, because it can store and release lithium ions and has satisfactory cycle properties and the crystal structure thereof hardly changes during charging or discharging. Examples of the carbonaceous material include graphite, non-graphitizable carbon, and graphitizable carbon.

Graphite is particularly preferable because it has high electrochemical equivalent and can provide high energy density.

When graphite is used, it preferably has a true density of 2.10 g/cm$^3$ or more and a (002) interplanar spacing of less than 0.340 nm and more preferably a true density of 2.18 g/cm$^3$ or more and a (002) interplanar spacing of 0.335 to 0.337 nm. When non-graphitizable carbon is used, it preferably has a (002) interplanar spacing of 0.37 nm or more, a true density of less than 1.70 g/cm$^3$, and no exothermic peaks at 700° C. or more when it is subjected to differential thermal analysis (DTA) in air.

Examples of the carbonaceous material include thermally-cracked hydrocarbons, coke, graphite, glassy carbon, baked organic polymers, carbon fibers, active carbon, and carbon black. Examples of coke include pitch coke, needle coke, and petroleum coke. The baked organic polymers are defined as materials obtained by baking polymers such as phenol resins or furan resins at an appropriate temperature to carbonize the polymers.

The anode mix layer 6 can be prepared by, for example, the procedure below. Graphite powder, used as an anode active material, having an average particle size of 25 μm is prepared, and 90 parts by mass of the graphite powder and ten parts by mass of polyvinylidene fluoride acting as a binder are mixed, whereby an anode mix is prepared. The anode mix is dispersed in N-methyl-2-pyrrolidone acting as a solvent, whereby anode mix slurry is prepared. The anode mix slurry is applied onto both faces of the anode current collector 7 including a copper strip, dried, and then press-molded with a roll press, whereby the anode mix layer 6 is formed.

The electrolyte section includes a cathode electrolyte layer 3, an anode electrolyte layer 5, and a separator 4 for separating the cathode electrolyte layer 3 from the anode electrolyte layer 5. The cathode and anode electrolyte layers 3 and 5 contain an electrolyte solution.

The electrolyte solution contains an electrolyte salt and a solvent.

Examples of the electrolyte salt include lithium salts such as $LiPF_6$, $LiAsF_6$, $LiBF_4$, $LiClO_4$, $LiB(C_6H_5)_4$, $LiCH_3SO_3$, $LiCF_3SO_3$, $LiN(CF_3SO_2)_2$, $LiN(C_2F_5SO_2)_2$, $LiN(C_4F_9SO_2)$ $LiN(CF_3SO_2)$, $LiC(CF_3SO_2)_2$, $LiC_4F_9SO_3$, $LiAlCl_4$, $LiSiF_6$, LiCl, and LiBr. Those compounds may be used alone or in combination. In particular, $LiPF_6$ is preferable because high conductivity can be obtained.

The solvent may be a mixture of polypropylene carbonate and ethylene carbonate. Examples of the solvent include 4-fluoroethylene carbonate, vinylene carbonate, diethyl carbonate, dimethyl carbonate, 1,2-dimethoxyethane, 1,2-diethoxyethane, γ-butyrolactone, γ-valerolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetates, butylates, propionates, and fluorobenzene. Those compounds may be used alone or in combination.

The electrolyte solution usually contains a mixture of polypropylene carbonate (PC) and ethylene carbonate and also contains 1.0 mol/l of $LiPF_6$, dissolved therein, acting as an electrolyte salt.

The cathode and anode electrolyte layers 3 and 5 containing the electrolyte solution further contain a polymer material for retaining the electrolyte solution and are therefore in a gel state. A gel electrolyte is preferable because it has high ion conductivity and can prevent the electrolyte solution from leaking out of the battery. Examples of the polymer material include ether polymers such as polyethylene oxide and a crosslinked polymer containing polyethylene oxide, ester polymers such as polymethacrylates, acrylate polymers, and fluorovinylidene polymers such as a copolymer of hexafluoropolypropylene and polyfluorovinylidene or fluorovinylidene. Those polymers may be used alone or in combination. In view of oxidation-reduction stability, a fluorine polymer such as polyfluorovinylidene is particularly preferable.

The cathode and anode electrolyte layers 3 and 5 can be prepared by, for example, the procedure below. A copolymer is prepared by subjecting 93 parts by mass of polyvinylidene fluoride (PVDF) and seven parts by mass of hexafluoropolypropylene (HFP) to block copolymerization. A solvent mixture consisting of 50% of polypropylene carbonate (PC) and 50% of ethylene carbonate (EC) is prepared and $LiPF_6$ acting as an electrolyte salt is dissolved in the solvent mixture, whereby an electrolyte solution with a $LiPF_6$ content of 1.0 mol/l is prepared. The cathode and anode electrolyte layers 3 and 5 are prepared using the polymer and the electrolyte solution.

The lithium ion polymer secondary battery further includes covers (protective tapes) 10a, 10b, 10c, 10d, 10e, 10f, and 10g.

The lithium ion polymer secondary battery further includes a cathode lead terminal 8 and an anode lead terminal 9 both placed close to end areas of the rolled electrodes. The cathode lead terminal 8 is fixed to a tail portion of the cathode current collector 1 by a welding process or another process, the tail portion being exposed from the cathode active material layer 2. The anode lead terminal 9 is fixed to a tail portion of the anode current collector 7 by a welding process or another process, the tail portion being exposed from the anode mix layer 6. The term "tail portion" herein means an outer end portion of each rolled electrode.

The cathode and anode lead terminals 8 and 9 are used to extract the electromotive force generated between the rolled electrodes. The cathode and anode lead terminals 8 and 9 have the same configurations as those of lead terminals of known lithium ion polymer secondary batteries and each include corresponding thin strips made of aluminum, platinum (Pt), gold (Au), an aluminum alloy, a platinum alloy, or a gold alloy. The thin strips have high conductivity and are resistant to chemical reaction occurring between the rolled electrodes.

Figure 2:
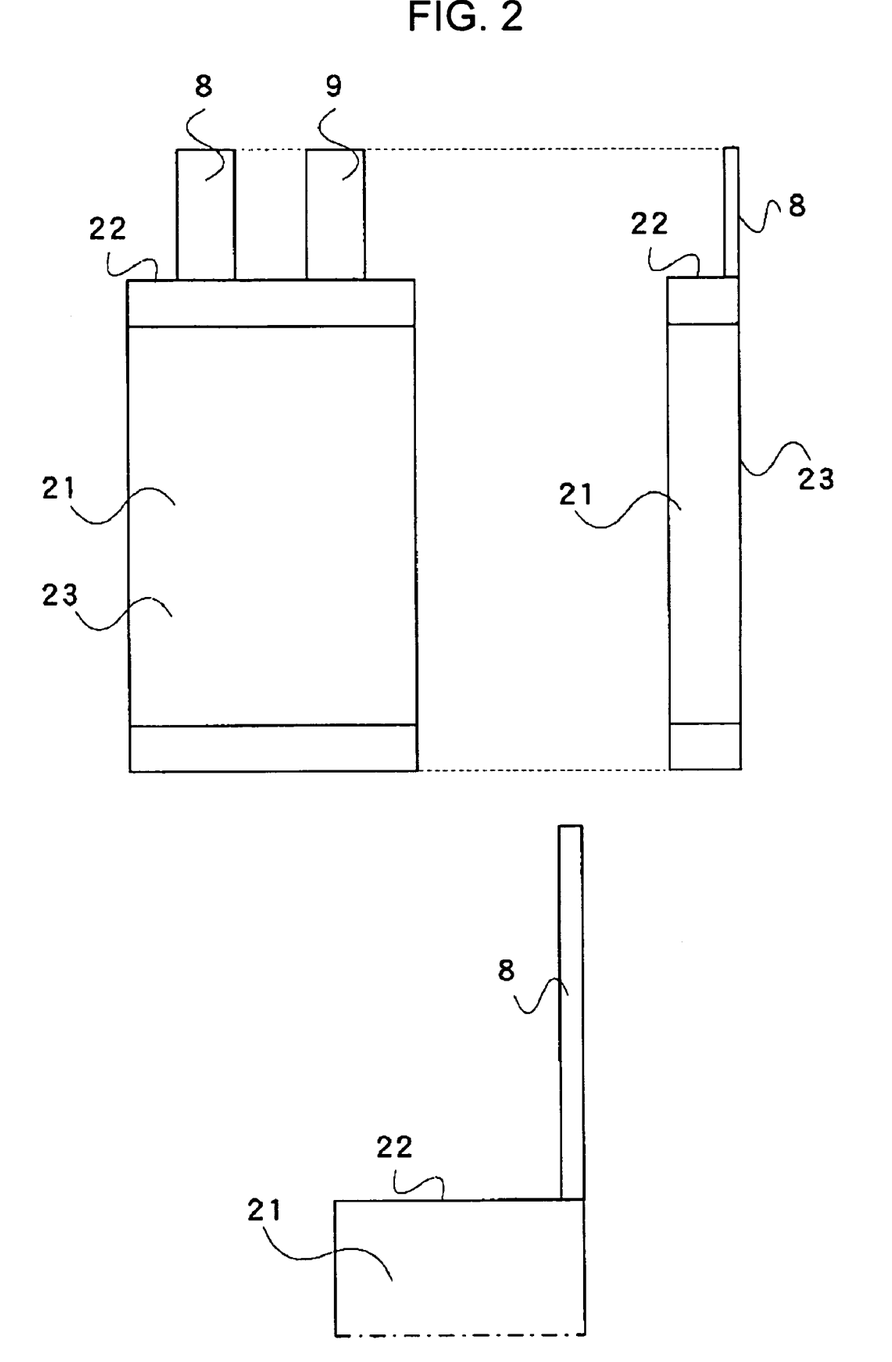
FIG. 2 is a schematic view showing the battery having portions from which lead electrodes extend.
Figure 3:
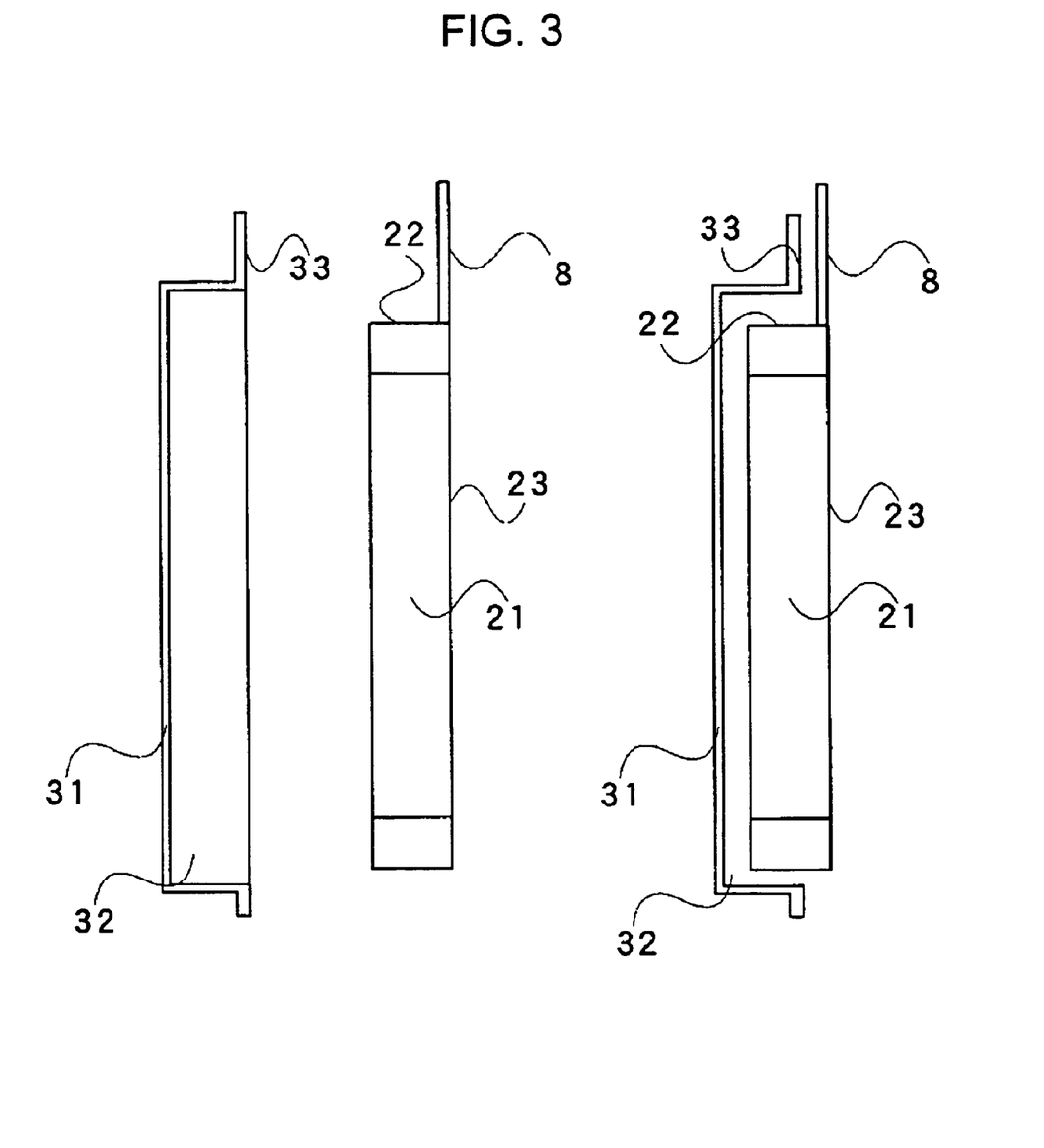
FIG. 3 is a schematic view showing a jacket for covering the battery.

Since the cathode and anode lead terminals 8 and 9 are fixed to the tail portions of the rolled electrodes, the cathode and anode lead terminals 8 and 9 do not extend outward from a center portion of an end face 22 from which leads extend but extend outward from an end area of the end face 22 as shown in FIG. 2, the end area being located close to a side face 23. The side face 23 is exposed from an opening of a recessed section 32 of a jacket 31.

When a flat-shaped unit cell 21 including a plurality of spirally rolled electrodes and lead terminals connected thereto is placed in the recessed section 32 of the jacket 31, the cathode and anode lead terminals 8 and 9 need not be bent but is allowed to extend straight out of the jacket 31. Therefore, the following space and insulator are not necessary: a space occupied by bent portions of the cathode and anode lead terminals 8 and 9 and an insulator for preventing a short circuit from occurring between the rolled electrodes and the cathode and anode lead terminals 8 and 9. Thus, the battery has a larger energy density per volume as compared to known batteries.

The jacket 31 as well as known one has a folding section, which is not shown, and a terrace section 33. The folding section is a portion of the jacket 31 that extends from a face located opposite to the end face 22 or extends from the side face 23. The recessed section 32 is covered with the folding section, of which end portions are fixed to the terrace section 33 by thermal fusion. In order to hermetically sealing the unit cell 21 placed in the recessed section 32, another section of the jacket 31 other than the folding section may be used and a bonding technique other than the thermal fusion may be used.

The jacket 31 includes an adhesive layer made of polypropylene (PP), a metal layer made of aluminum, and a surface-protecting layer made of nylon or polyethylene terephthalate (PET). The adhesive layer has a function of preventing the deterioration of the polymer electrolyte and is preferably made of cast polypropylene (CPP) or the like. The metal layer has a function of preventing the penetration of moisture. The surface-protecting layer has a function of protecting the surface.

The present invention is not limited to the embodiment. Various modifications and changes may be made within the scope of the present invention. The embodiment discloses the flat-shaped battery including the spirally rolled electrodes; however, the present invention in not limited thereto. The present invention is applicable to a cylindrical battery including cylindrically rolled electrodes or a prism-shaped battery including rolled electrodes. Furthermore, the present invention is applicable to a battery having a configuration in which only one of lead terminals each connected to a cathode or anode extends from a center portion of rolled electrodes.

The rolled electrode-including battery of the present invention is described above using the lithium ion polymer secondary battery as an example, the lithium ion polymer secondary battery being a species of battery including stacked electrodes and containing the gel electrolyte. The present invention is not limited to the lithium ion polymer secondary battery and is applicable to a primary battery that is neither recharged nor redischarged or a lithium ion secondary battery containing a liquid electrolyte. The present invention is applicable to any battery that contains a gel or plastic electrolyte other than a solid polymer electrolyte and includes flexible electrodes. In the present invention, a material for forming the cathode or anode and a metal material for forming the lead terminals are not limited to those described above.

What is claimed is:

1. A battery comprising:
a unit cell including spirally rolled electrodes,
wherein the spirally rolled electrodes include a cathode electrode and an anode electrode that extend spirally from a center of the unit cell in a direction of rolling such that a cathode outer end of the cathode electrode and an anode outer end of the anode electrode are located in the unit cell at a location that is furthest from the center of the unit cell,
wherein the cathode outer end includes an inner surface that faces the center of the unit cell and an outer surface that faces an outer periphery of the spirally rolled electrodes, and
wherein the anode outer end includes an inner surface that faces the center of the unit cell and an outer surface that faces the outer periphery of the spirally rolled electrodes;
a jacket including a recessed section;
a cathode lead terminal attached to the inner surface of the cathode outer end such that the cathode lead terminal extends perpendicular to the direction of rolling; and
an anode lead terminal attached to the inner surface of the anode outer end such that the anode lead terminal extends perpendicular to the direction of rolling,
wherein the recessed section includes an opening, the unit cell is placed in the recessed section such that the outer periphery of the spirally rolled electrodes faces the opening, and the recessed section is covered with a portion of the jacket, such that the cathode lead terminal and the anode lead terminal each extend straight out of the jacket without bending.

2. The battery according to claim 1, wherein the unit cell includes an electrolyte section containing a polymer electrolyte.

3. The battery according to claim 1, wherein the jacket includes an adhesive layer containing polypropylene, a metal layer containing aluminum, and a surface-protecting layer containing nylon or polyethylene terephthalate.

4. The battery according to claim 2, wherein the polymer electrolyte is a copolymer obtained by subjecting polyvinylidene fluoride and hexafluoropolypropylene to copolymerization.

5. The battery according to claim 1, wherein the cathode contains a cathode active material.

6. The battery according to claim 1, wherein the anode contains an anode active material.

7. The battery according to claim 5, wherein the cathode active material is lithium cobalt oxide.

8. The battery according to claim 6, wherein the anode active material is graphite.

9. The battery according to claim 1, wherein the jacket includes a terrace section is configured to be sealed by thermal fusion such that the unit cell is hermetically sealed within the jacket.

* * * * *